United States Patent [19]

Gordon

[11] Patent Number: 4,918,304

[45] Date of Patent: Apr. 17, 1990

[54] FLYING SPOT IMAGE SCANNER THAT UTILIZES A CRT COUPLED TO A NONCOHERENT FIBER OPTIC BUNDLE

[75] Inventor: Eugene I. Gordon, Summit, N.J.

[73] Assignee: Photon Imaging Corp., Edison, N.J.

[21] Appl. No.: 325,455

[22] Filed: Mar. 17, 1989

[51] Int. Cl.[4] .......................... H01J 5/16; H01J 40/14
[52] U.S. Cl. ................ 250/227.26; 358/484; 250/227.28
[58] Field of Search ............... 250/227, 234, 235, 560; 350/6.1, 6.3, 6.6; 358/484, 485, 901

[56] References Cited

U.S. PATENT DOCUMENTS

| | | | |
|---|---|---|---|
| 3,840,701 | 10/1974 | Tomii et al. | 358/901 |
| 4,390,903 | 6/1983 | Pomeroy | 358/484 |
| 4,454,547 | 6/1984 | Yip et al. | 358/484 |
| 4,528,593 | 7/1985 | Nicol | 358/484 |
| 4,597,017 | 6/1986 | Johnson et al. | 358/485 |
| 4,636,639 | 1/1987 | Guillaume et al. | 250/560 |
| 4,645,917 | 2/1987 | Penney et al. | 250/560 |

Primary Examiner—David C. Nelms
Assistant Examiner—William L. Oen
Attorney, Agent, or Firm—Herbert M. Shapiro

[57] ABSTRACT

An image scanner utilizes an area CRT while avoiding the low linear resolution limitations of such a device. The CRT is coupled to a noncoherent fiber optic bundle (area array) having a proximal end of a geometry to optically match the scanned area of the face plate. The remote end of the fiber array is linear and coupled to a scan segment of a page to be scanned. The beam of the CRT is directed to the consecutive fibers of the bundle in a sequence imposed by a look-up table containing digital addresses and digital to analog converters to produce the required x-y deflection voltages. Since there need only be 5100 fibers for a 600 line per inch scanner and the spot resolution of the CRT need only be in excess of 5100 positions, the resolution is easily obtained. For example, 5100 spots implies a linear resolution of 72 elements in a scan line. The decay time of the phosphor is chosen to be short enough that only one fiber is illuminated at any instant. A single output photodetector is used for monochrome and a three output photodetector is used for color.

23 Claims, 2 Drawing Sheets

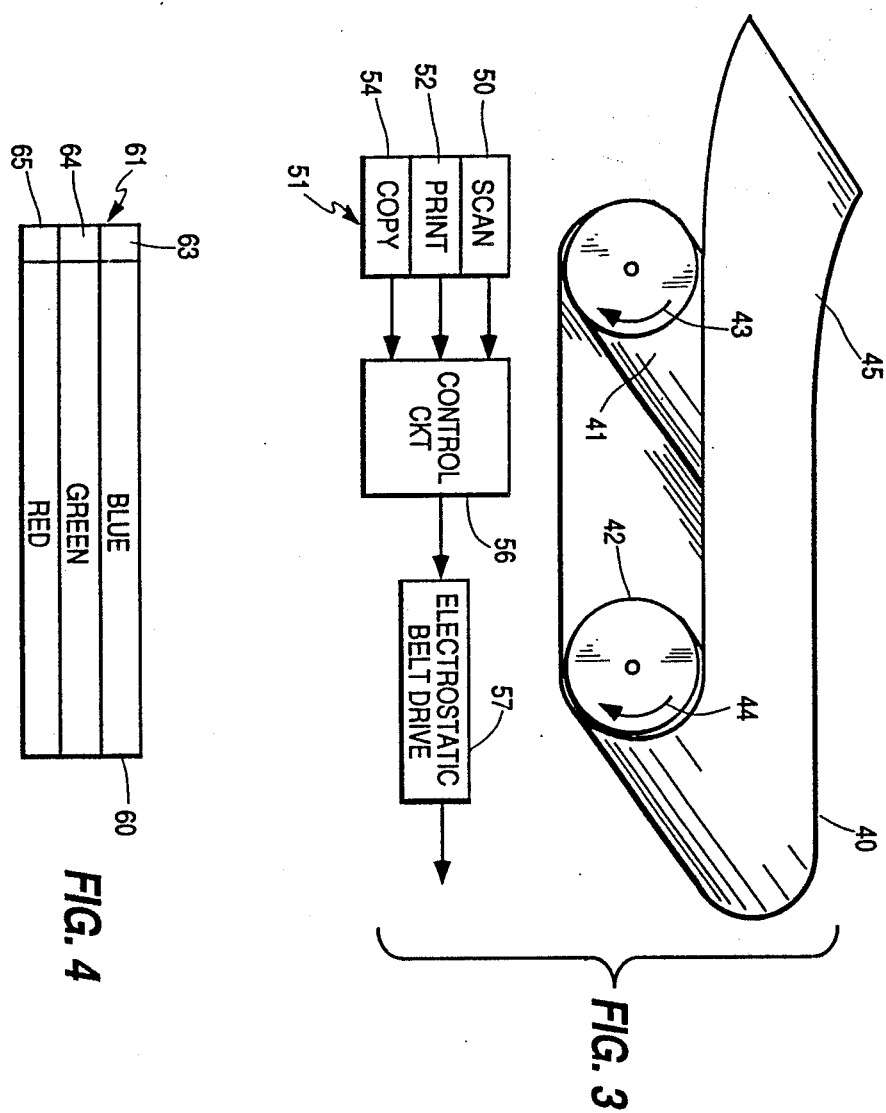

FLYING SPOT IMAGE SCANNER THAT UTILIZES A CRT COUPLED TO A NONCOHERENT FIBER OPTIC BUNDLE

FIELD OF THE INVENTION

This invention relates to a scanner and more particularly to a scanner employing light pipes such as optical fibers.

BACKGROUND OF THE INVENTION

U.S. Pat. No. 4,674,834 issued June 3, 1987, discloses a page scanner employing a non-coherent fiber optic bundle in which fibers extend from a linear entrance field to a rectangular exit field. The bundle is called "noncoherent" because there is no established or predetermined relationship between the ends of the fibers in the exit field and the corresponding ends of the fibers in the entrance field. The rectangular exit field is coupled to a corresponding photo-sensor array having a significantly larger number of sensors compared to the number of fibers.

The determination of a sequence of sensors of the sensor array to correspond to the sequence of fiber ends (viz: pixels) in the entrance field is carried out electronically. This determination is made during an initialization procedure where the exit field is imaged onto an array of discrete sensors and a light slit is moved along the entrance field in a manner to establish an address string for a subset of the sensors of the array which corresponds to the sequence of pixels in the entrance field. Thus, the address string organizes the electronic signals exiting the sensor array to match the organization of pixels in the entrance field.

That patent also discloses a printer using a noncoherent fiber optic bundle. The printer employs a small (cigarette-size) cathode ray tube (CRT) operative to send an electron beam to a sequence of positions on the CRT face plate. In each instance, the resulting photons from the phosphor on the CRT face plate are focused by a lens onto a corresponding fiber of the area end of a fiber optic bundle. The sequence of beam positions, dictated by the consecutive addresses of the address string, cause photons to exit the linear end of the bundle (now the exit field of the fiber optic bundle) in a coherent sequence to scan a spot of light along a line segment.

Conveniently, the area end of the bundle adjacent the CRT is coated with a suitable phosphor and formed as the CRT face plate itself. This avoids the need for a lens and more of the available light is captured. In the application of the scanned light spot to a printer, the linear end of the bundle is focused by lens or proximity on an electrostatic medium and operated to discharge that medium in accordance with the on-off light signals imposed by the CRT, thus forming a non mechanical scanner. In contrast, in a laser flying spot scanner the light from the laser is scanned by a rotating polygon. It is to be understood that in a printer, the entrance field is at the rectangular or area face of the bundle and the exit field is the linear face.

BRIEF DESCRIPTION OF AN EMBODIMENT OF THIS INVENTION

The present invention employs the non mechanical imager of the above-disclosed fiber optic printer but couples the linear end of the fiber optic bundle to a line or scan segment of a page to be scanned instead of to an electrostatic medium. An optical sensor is also coupled to the page at the line or scan segment being scanned. The CRT introduces white light into the fiber ends in the sequence imposed by the address string. Thus light emerges from the fiber ends in the linear array in sequence and falls immediately on the page in a small spot. A (single) detector astride the page at the linear end senses the light reflected and scattered from each pixel in sequence. The outputs of this detector for a given scan segment constitute electrical signals representative of the pixels of that scan segment.

BRIEF DESCRIPTION OF THE DRAWING

FIG. 3 is a schematic representation of a portion of a copier in accordance with another aspect of this invention; and FIG. 4 is a schematic representation of a portion of a color scanner in accordance with this invention.

DETAILED DESCRIPTION OF AN EMBODIMENT OF THE INVENTION

Figure 1:
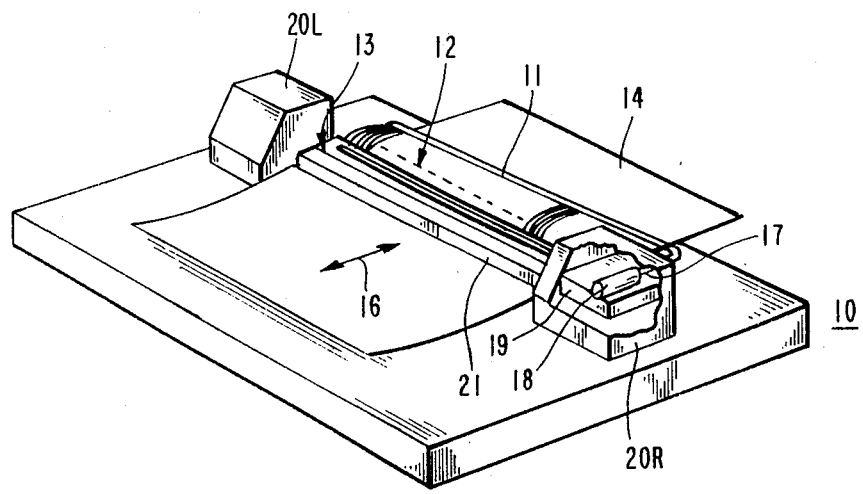
FIG. 1 is a schematic representation of a flying spot scanner in accordance with the principle of this invention.

FIG. 1 shows a scanner 10 in accordance with the principle of this invention. The scanner includes a fiber optic bundle 11 which has a linear end 12 constrained by a ferrule 13 and adapted to be coupled to a page 14. The page is movable along an axis of movement indicated by double-headed arrow 16.

The remote end 17 of the bundle is formed into a rectangle, fused, cut and polished flat. End 17 conveniently is coated with a phosphor and formed as the face plate of a CRT. The CRT is shown at 18 in FIG. 1. The control electronics for the CRT is represented at 19. Alternatively the image on the face of the CRT is transferred to the end of the fiber bundle via a lens system.

CRT 18 and control electronics 19 are located within a housing 20R and ferrule 13 extends between housing 20R and a spaced-apart housing 20L defining a position between them for accepting page 14. The linear end 12 of bundle 11, extending between housings 20R and 20L, defines a line or scan segment cross page 14. Each time the page is moved with respect to the entrance field along axis 16, the fibers are illuminated consecutively and individually, via CRT 18, by sending an electron beam to the sequence of positions imposed by the stored address string determined during an initialization procedure. Each position is established so as to apply light to only one of the fibers. The decay time of the phosphor on the CRT face plate is chosen to be shorter than a period defined as the average time allocated to one fiber or as the scan time divided by the number of fibers. This insures that light emerges from only one fiber at any one instant, a characteristic of a scanner embodiment but not necessary for the printer disclosed in the above-mentioned patent.

A detector 21, positioned at ferrule 13, senses the presence or absence of light (reflected or scattered from the paper) at each of the fiber ends, coupled to the page. Thus, only a single sensor is required. If 5100 fibers are used (600 per inch across an 8.5 inch page), the CRT sends the light to the 5100 fibers consecutively in the order of the address string and the (single) detector senses the consecutive responses (pixels) from the exposed portions of the scan segment of the page in each instance.

Figure 2:
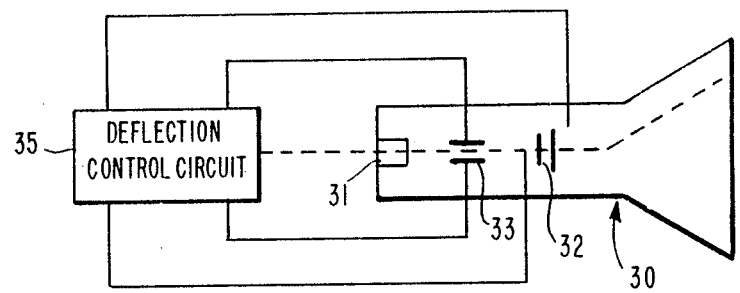
FIG. 2 is a schematic representation of a portion of the scanner of FIG. 1.

FIG. 2 shows a CRT 30 suitable for use in the scanner of FIG. 1. The CRT includes a cathode 31 for generating electrons, beam forming electrodes and a control grid as well as x and y deflection plates 32 and 33 respectively and electron lenses (not shown) to focus the electron beam on the face plate. The deflection plates are operative in response to voltages applied to the plates by deflection control circuit 35 which is assumed to include a pair of digital to analog (D to A) converters to produce the required x-y deflection voltages. Normally, circuit 35 is operative to scan the focused spot on the face plate from side to side and to then increment to a next line in a familiar raster scan sequence. The number of electrons falling on each position determines the amount of light emitted and the number of electrons is varied by the control grid. Alternatively, a CRT can be used in a vector scan mode in which the electron beam is vectored to the consecutive positions dictated by the address string. The address string is stored digitally in the lookup table and the digital numbers are converted to analog deflection voltages by the D/A converters.

An electrostatic CRT would be relatively fast in this connection and is the most viable choice for vector scanning embodiments at the present time. Even for as much as a 5100 fiber bundle, deflection of only $+/-50$ mils is required. An electrostatic CRT having a diameter of about 0.5 inch and a length of about three inches would be suitable and are of the type commercially available for film writing. A phosphor such as P-43 or thin film phosphor such as cerium doped yttrium aluminum garnet would be chosen so as to achieve decay times of the order of 100 ns.

Detector 21 may comprise any suitable photodetector such as a silicon photodiode. The detector is positioned at linear end 12 in a position to sense light incident to the page at the scan segment (via the fiber corresponding to the instant address of the address string) and then scattered from the surface. The detector conveniently has a geometry to funnel light to a single relatively tiny photodetector in order to improve signal to noise parameters. Alternatively, a linear array of say 5 to 10 silicon photodetectors in parallel along the width of the document can be used.

The analog pixel data so provided by the detector is converted to digital numbers and stored in a buffer assumed to be included in electronics 19 of FIG. 1 in a manner analogous to that disclosed in the above patent. Alternatively, the analog pixel data can be outputted directly. For a scanner with a resolution of 600 dots per inch, a scan segment can be read in this manner in about 1 millisecond. An eleven inch long document, at a commensurate resolution, requires about 6600 scan segments or less. Thus, an $11 \times 8.5$ inch document can be scanned by the flying spot scanner here disclosed in less than about 7 seconds.

In a practical implementation of the flying spot scanner of FIG. 1, a CRT beam is moved to a particular spot on the face plate dictated by the address string. The beam is turned on to produce a flash of light from the phosphor at the spot selected. The phoshor-emitted light is focused onto the end of a fiber and transmitted through the fiber and focused onto the page. The light is reflected and scattered off the page and collected by the photodetector arrangement.

The signal to noise ratio for gray scale imaging can be calculated from the beam current of the CRT, based on the linearity of the phosphor, the transmission medium and the photodiode. Then the number of photoelectrons produced during the exposure time can be calculated to determine the desired signal to noise ratio.

For a P-46 type phosphor assumed, each electron landing on the phosphor produces multiple photons, one photon for every 25 ev of beam energy remaining after penetrating the aluminum layer. Thus for 2500 ev beam energy (about 2700 volt accelerating potential) there are about 100 photons (about 2 ev in energy). The energy efficiency is 2/25 or 8%.

The photons are collected, for example, by a lens and focused on the end of the selected fiber. The numerical aperture (N/A) of the lens is chosen to be less than that of the fiber. Consequently, all the photons are applied to the core of the selected fiber. We assume that only 10% of the photons are transmitted to the core and all of these are transmitted to the remote end of the fiber. We assume 90% of these transmitted photons pass through a selfoc lens array between the linear ends of the fibers and the page is being scanned. Assume 50% of the photons emerging from the selfoc lens array are incident on the paper. The overall transmission is:

$$0.1 \times 0.9 \times 0.5 = 45 \times 10^{-3} = 0.045 = L \quad \text{(eqn 1)}$$

We assume that 10% is collected by a photodetector that has a 0.75 QE (detector conversion efficiency). The net conversion efficiency is:

$$G = 10^2 \quad \text{(eqn 2)}$$

We can determine the current of the photodetector $I_p$ with respect to the beam current $I_b$ as:

$$\frac{I_P}{I_b} = G \times L \times QE = 10^2 \times 4.5 \times 10^{-3} \times 0.75 \quad \text{(eqn: 3)}$$
$$= 0.75 \times 4.5 \times 10^{-1} \sim 0.33$$

The value of the beam current ($I_b$) is 10 microamperes (μamp). Thus, the photocurrent is 3.3 μamp, an enormous signal. If we assume a practical beam-on time of $10^2$ seconds, the signal charge, $S_c$, is given by $$S_c = 3.3 \times 10^{-6} \times 10^{-7} = 3.3 \times 10^{-13} \text{ coulombs.} \quad \text{(eqn 4)}$$

This charge corresponds to $3.3 \times 10^{-3}/1.6 \times 10^{-19}$ electrons or $\sim 2 \times 10^6$ photoelectrons. This full light level signal of 3.3 μamp compares to a 10 n amp dark current and has a variance of $$\sqrt{2 \times 10^6} = 1.4 \times 10^3.$$

The smallest signal for N level gray scale is smaller by $$\frac{1}{\sqrt{N}} \text{ i.e., } 1.4 \times \frac{10^3}{\sqrt{N}}.$$

For N=256, the signal is $$1.4 \times \frac{10^3}{\sqrt{N}} \sim \frac{141}{1.6}.$$

A highly desirable signal to noise level is achieved.

The fiber optic subassembly adapted for scanning a page herein can be seen to be identical to the subassembly used in the printer disclosed in the above-mentioned patent. One addition is that for the scanner the decay time of the phosphor is chosen to be shorter than the scan time divided by the number of fibers. A printer, however, can be made using such a phosphor also but not necessarily so. Accordingly, a subassembly with such a phosphor is suitable for both a scanner and a printer.

The subassembly disclosed herein for scanning is contact assembly. That is to say, the linear end of the assembly is imaged onto a scan segment being scanned. This is in contrast to a laser scanner which directs a beam at consecutive positions of a scan segment.

In order to use a single such "contact" subassembly for both scanning and printing, the linear end of the assembly has to be moved from contact with a page to contact with an electrostatic medium controllably. Such an arrangement can be implemented by moving the fiber optic bundle itself. A preferred alternative is to move the electrostatic medium and paper moving mechanism to the linear end of the fiber optic bundle. In a most simple arrangement, the electrostatic belt may be used as a platen for the paper during a scan mode of operation.

FIG. 3 shows one such arrangement. Specifically, FIG. 3 shows an electrostatic medium 40 which is movable clockwise on rollers 41 and 42 as indicated by curved arrows 43 and 44. The electrostatic medium is operated in the printer mode as described in U.S. Pat. No. 4,6674,834 noted above.

In the scanner mode, rollers 41 and 42 are positioned in the arrangement of FIG. 1 so that a page (45 in FIG. 3) is positioned as is page 14 or FIG. 1. That is to say, rollers 41 and 42 are disposed between housings 20R and 20L of FIG. 1. A scan operation proceeds in response to the depression of a "scan" key in keyboard 51. A page is introduced as shown in FIGS. 1 and 3.

A print mode proceeds in response to the depression of a "print" key 52 in keyboard 51, operation proceeding as disclosed in U.S. Pat. No. 4,674,834. But in this instance, no page is introduced. The page instead is stored in memory which typically resides in a host computer to which the apparatus is connected.

A copy mode proceeds in response to the depression of a "copy" key 54, printing out a copy of a page stored in memory during a scan operation of a page introduced during a previous scan operation.

Keyboard 51 is connected to a control circuit 56 for controlling the electrostatic belt drive 57 for adjusting the speed of the belt for scan or print operations.

The scanner of FIG. 1 is adapted for color operation by, for example, including red, green and blue sensitive photodetectors instead of the single photodetector 21 of FIG. 1.

FIG. 4 shows the configuration of a red, green, and blue photodetector arrangement 60. The photodetector arrangement of FIG. 4 is viewed from the underside, the surface on which the light reflected from the page is incident. In the flying spot scanner disclosed herein, the light incident on a scanned page is incident at any given time only on one spot. Thus, any light entering the photodetector arrangement 60 is related to that single spot. By situating even a single photodetector at the end, say end 61, in positions 63, 64, and 65 and by a suitable light capturing "rod" with associated red, green and blue dichroic filter facing the page, a sequence of color coded signals is received during the scanning of each segment of the page.

Other detection schemes are useful also. For example, the arrangement of FIG. 4 can be adapted to include a photodetector at both ends of the rod. Alternatively, a rod need not be used. A plurality of color sensitive photodetectors can be positioned along the linear end to sense light directly from the page.

Additional fibers not associated with the linear end can be included in the optical fiber bundle. Such additional fibers having a photodetector associated with their output ends can be used for beam indexing using feedback to ensure positional accuracy.

The foregoing decription assumes that the flying spot brightness is uniform. This may not be the case due to differences in individual transmission paths. It may be desirable, accordingly, to modulate the control grid of the CRT to vary the beam current to achieve uniform flux at the linear face of the fiber optic bundle.

Differences in individual transmission paths can be determined by directing light to a white page through the fiber optic bundle and measuring the spot brightness in each instance. A second "page" of a lookup table stores data representative of the brightness to be achieved (gain) to overcome any variation with respct to a nominal brightness level. The second page of the lookup table is used to obtain data to modulate the CRT control grid. Alternatively, a scanner photodetector post amplifier can be modulated according to the second page of the lookup table to achieve uniform detector output. Again, the second page is obtained by scanning a uniform white page and storing differences in response from a reference nominal response for each position in the linear face of the fiber optic bundle. Compensating gain also can be provided at the A to D converter as is common in CCD scanners today where variation from pixel to pixel occurs.

Although initialization of the scanner disclosed herein can be carried out by initialization procedures analogous to those disclosed in the above-mentioned patent, a relatively faster initialization procedure uses spot position modulation of the CRT beam itself. This technique is based on the recognition that the area end of a fiber optic bundle suitable for use in accordance with the principles of this invention includes an array of, for example, $75 \times 75$ fiber ends requiring that many light spot positions. The address grid on the CRT is, for example, $512 \times 512$ to insure precision lineup.

In accordance with this technique, the CRT beam is moved to consecutive ones of the $512 \times 512$ addresses and the light is collected at the linear end of the bundle noting the subset of addresses that produces the maximum light output. A small ac deflection voltage containing components at frequencies $f_x$ and $f_y$ are added to the address driver dc x and y deflection voltages for the CRT deflection plates respectively. These added ac voltages modulate the light output from the fiber end when the beam is positioned at an appropriate spot for a fiber.

The light output of an optimaly positioned beam shows a maximum first harmonic and a minimum fundamental when the light transmission through the fiber is phase-sensitive detected. Thus using a feedback system, the optimum address for each fiber is found. This same dithering technique is used in the feedback system with the beam indexing to establish optimum alignment.

The proper sequence for the fibers selected in this manner is determined by passing a slit along the linear end, by focusing a subset of the linear end on a CCD linear array and scanning to determine which fiber is lit or by positioning the CRT beam at an optimum address and by scanning the linear end.

In using the optical fiber bundle-CRT combination, the only mode described so far is the flying spot mode. There are other operating modes that may have significant speed advantages. Consider that the time to scan a complete page either for printing or document scanning has three main components: (1) the time to step the page from line to line, (2) the time for the electron beam to slew and settle in the new position, and (3) the dwell time during which the optical fiber is delivered to the desired position. The step time is fixed. The dwell time per pixel is fixed for a given configuraton. However, there are two scanning modes that attack the total slew and dwell time. The first is the skip pixel mode and the second is the shortest path mode.

The skip pixel mode is used in the printer when the average pixel density is low. For example, in a printed document without a photograph or drawing the number of black pixels to be written on a white background is less than 10% of the total number of pixels. Thus, the line information is used to establish a sequence of line addresses that is presented to the lookup table for generation of the appropriate set of beam addresses to write back or gray pixels only. This reduces the writing time by 90% or more because the number of pixels addressed is reduced.

In the shortest path mode, the beam follows a roughly serpentine path with small deviations that allow it to address all of the fibers. The progressive sequence of light emissions from the linear array of fibers in the exit face characteristic of the flying spot made does not exit. However, the input information in the printing mode is reordered according to the data in the lookup table so that each fiber produces the proper signal. In the document scan mode the output data is reordered to produce a serial data stream corresponding to the sequential order to the pixels in the line being scanned. The software necessary to do the reordering is not complex. This mode reduces time substantially because the path of the beam along the face of the CRT is reduced from the random path of the flying spot scanner FSS mode.

In the scanner, only the shortest path mode is an alternative to the FSS mode. In the printer, either mode can be used with a trivial software change. Thus, either the skip pixel or shortest path mode can be chosen depending on the pixel density.

In any case, a lookup table stores a list of addresses of positions on the face plate of the CRT which correspond to fiber positions in the linear face of the fiber optic bundle for arranging pixel data to correspond to the pixel positions at the linear face of the bundle.

What is claimed is:

1. A scanner comprising a plurality of light pipes extending from a first to a second face, said scanner including a CRT having a face plate and means for directing an electron beam at selected consecutive positions on said face plate determined by an address string, said first face being coupled to said face plate such that said electron beam causes pulses of light to be introduced at consecutive ones of said plurality of light pipes, said scanner also including a detector positioned opposing said second face to collect light constituting pixel data generated in response to light exiting consecutive ones of said plurality of light pipes in said second face.

2. A scanner in accordance with claim 1 wherein said plurality of light pipes are arranged in a linear geometry in said second face in a manner to define a scan segment on a page and said second face comprises an exit field, said scanner also including means for moving a page with respect to said scan segment.

3. A scanner in accordance with claim 2 wherein said plurality of light pipes comprises a fiber optic bundle.

4. A scanner in accordance with claim 3 wherein the end of said plurality of fibers in said first face defines an entrance field and said fiber ends are fused, cut, and polished to form a surface, said surface including thereon a layer of light emitting material responsive to the presence of electrons to emit light, and said surface forming said face plate, the time constant for said layer of light emitting material being shorter than the time for the beam to move from one position to the next.

5. A scanner in accordance with claim 4 wherein said phosphor comprises a cerium doped yttrium aluminum garnet.

6. A scanner in accordance with claim 4 wherein said electron beam is electrostatically deflected.

7. A scanner comprising a plurality of light pipes having first and second ends, said first end being arranged in a linear goemetry to define a scan segment of a page coupled to it, said second ends being fused, cut and polished in manner to define a surface, means for introducing light into the ends of consecutive ones of said light pipes in said surface according to an address string, and means for detecting light signals from said scan segment responsive to said light.

8. A scanner in accordance with claim 7 wherein said plurality of light pipes comprises a fiber optic bundle.

9. A scanner in accordance with claim 8 wherein said means for introducing light comprises a CRT.

10. A scanner in accordance with claim 9 wherein said means for detecting includes a photodetector adjacent said first end of said bundle for detecting light from a page being scanned by said scanner.

11. A scanner in accordance with claim 9 wherein said means for detecting includes a sensor arrangement adjacent said first end, said sensor arrangement including first, second and third detectors responsive to light of first, second, and third colors respectively.

12. A scanner in accordance with claim 9 in combination with an electrostatic medium adjacent to said first end and means for selectively introducing a page to be scanned between said electrostatic medium and said linear end.

13. A scanner in accordance with claim 11 in combination with an electrostatic medium adjacent to said first end and means for selectively introducing a page to be scanned between said electrostatic medium an said linear end.

14. A combination in accordance with claim 12 also including control means for changing the speed at which said electrostatic medium moves for scanning or for printing operations.

15. A combination in accordance with claim 3 also including control means for changing the speed at which said electrostatic medium moves for scanning or for printing operations.

16. A scanner in accordance with claim 9 also including gain-control means for providing uniform brightness in the transmission paths defined by each of the fibers of said fiber optic bundle.

17. Apparatus comprising a plurality of light pipes extending from a first to a second face, said apparatus including a CRT having a face plate and means for directing an electron beam at selective consecutive positions on said face plate determined by an address string, said first face being coupled to said face plate such that said electron beam causes pulses of light to be introduced at consecutive ones of said plurality of light pipes, said face plate including thereon a layer of light emitting material responsive to the presence of electrons to emit light, the time constant for said layer of light emitting material being shorter than the time for the beam to move from one position to the next.

18. Appatatus in accordance with claim 17 in which said plurality of light pipes comprises a fiber optic bundle.

19. Apparatus in accordance with claim 18 also including means for moving an image in an object plane coupled to said second face.

20. Apparatus in accordance with claim 18 also including electrostatic means coupled to said second face.

21. In combination, a bundle of optical conduits having a linear face and an area face, a CRT optically coupled to said area face, said combination including a detector operative for detecting light reflected or scattered from an object plane optically coupled to said linear face, said combination also including lookup table means for storing a list of addresses of selected positions on the face plate of said CRT corresponding to all fiber positions in said linear face for organizing pixel data to correspond to the pixel positions at said linear face.

22. A combination in accordance with claim 21 in which said optical conduits comprise optical fibers.

23. A combination in accordance with claim 22 wherein said list of addresses is operative to move the electron beam of said CRT to a sequence of face plate positions which corresponds to the sequence of pixels in said linear end.

* * * * *